United States Patent Office 2,892,592
Patented June 30, 1959

2,892,592
RAILROAD TIE PADS

John H. Greene, Port Arthur, Tex., and Robert R. Thurston, Chappaqua, N.Y., assignors to Texaco Inc., a corporation of Delaware No Drawing. Application December 31, 1954
Serial No. 479,234

4 Claims. (Cl. 238—283)

This invention relates to certain new and useful improvements in railroad tie pads.

A tie pad is a pad or mat of some material intended to be inserted between the metal tie plate and the wooden tie for the purpose of protecting the tie from cutting and abrasion. A combination of qualities is desirable for a tie pad. It must have the necessary structural strength so that it will maintain its form and continue to give protection for a considerable period of time and it should be inexpensive. It is also desirable that the material in the tie pad resist moisture, and in some cases good adhesive qualities for adhesion to the tie or between the tie plate and the tie is desirable to form a seal. This seal protects against the entry of water, sand and dust. It has been a problem to produce a tie pad having the desired combination of characteristics.

The invention contemplates a preformed pad or mat of glass fiber, asphalt and rubber adapted to be placed between the tie plate and the tie.

The glass fiber has been found to be an excellent rot proof material as a base for the retention of the asphalt and rubber, supplying the necessary structural strength so that the mat will not become distorted or fractured in use. In the manufacture of glass fiber mats the glass filaments are distributed in the form of a mat to which a binder such as a phenol resin is added. Alternately, the glass filaments may be woven into yarn and glass fabric and the mat is baked to cure the resin. A particularly good mat for the purposes of the invention is composed of a combination of such a glass mat reinforced with coarser yarn filaments in a regular, random or swirl pattern and containing a suitable binder.

The rubber adapted for the composition may be obtained from various sources either natural or synthetic or a combination of both. Preferably the rubber is new or reclaimed natural crumb rubber or synthetic crumb rubbers or polymers such as butadiene styrene, polybutadiene, isobutylene styrene, polyisobutylene. An asphalt rubber composition can be prepared from a polymer latex by heating and removal of the water content but generally it appears that superior pads are prepared from the crumb rubber. The most desirable material for the composition is found to be pulverized or finely ground reclaimed tire rubber or other scrap rubber. The reclaimed rubber will generally comprise a mixture of vulcanized synthetic and natural rubbers, and this material in pulverized condition is suitable for making very superior type products.

The asphalt in the composition is a petroleum asphalt, such as of 100–250° F. melting point, and of good temperature susceptibilities.

It is found that this combination of glass fiber, asphalt and rubber results in a tie pad possessing to a high degree the qualities that have been previously sought. The combination gives the necessary structural strength while at the same time providing the desired adhesiveness and sealing. The glass fiber functions to retain the asphalt-rubber material, that is, the coating material is not squeezed out under the great weight to which the pad is subjected to such extent as to impair the pad, but at the same time there is sufficient squeezing of the coating material to fill in unused tie plate spike holes and any crevises in the wood and provide an efficient seal against the entrance of moisture, sand and dust. The pad has the important advantage that it contains no organic fibers which would rot. In using scrap or reclaimed rubber, rubber containing organic fibers are preferably excluded.

In preparing the pads the glass fiber fabric is preferably coted or impregnated with the asphalt-rubber material in a manner similar to the coating of roofing felts with asphalt by being carried with rollers through a coating tank containing the asphalt-rubber composition and drawn through rollers adapted to regulate the thickness of the coated mat. The material is then cut into the desired sizes for the tie pads.

A feature of the invention is the incorporation in the asphalt-rubber coating composition of certain materials which promote adhesion. Suitable materials for this purpose are pine tar and coal-tar products and various asphalt adhesion additives. Certain synthetic waxes may also be employed, and anti-stripping agents such as tall oil may be added to the coating mixture.

Another feature of the invention involves the addition of a filler to the coating composition which is applied to the glass fiber fabric. Various filling materials such as asbestos, ground oyster shell, glass wool, mica and mineral or rock wool, may be incorporated in the asphalt-rubber coating material. The fillers impart additional strength to the tie pad. The presence of the ground oyster shell has been found to facilitate the control of the coating operation.

There is some variability as to the characteristics demanded for tie pads; thus in some cases it is desired to have a considerable squeezing of the coating material while in other situations it is desired to limit extrusion of the coating material from the pad to a minimum. The invention provides a ready means of meeting these variable requirements since the coating composition can be varied to provide the particular type of pad desired.

The proportions of the materials in the coating composition will vary considerably depending upon the specific characteristics desired in the pad but in general the asphalt component will approximate some 50–80% by weight of the coating composition and the rubber component some 15–35%. When using a filler it will normally constitute some 5–15% of the coating composition. Pine tar is advantageously used in proportions of about 5–10%. The synthetic wax is used in very small quantities usually less than 1% and agents such as tall oil are used in small quantities such as around 1%.

For purposes of storage and transportation it is advantageous to coat the finished tie pad with a material such as powdered talc or mica to prevent any sticking together or bleeding of the pads. However when the pad is installed under the tie plate the talc coating no longer serves any useful purpose. Accordingly another feature of the invention is to coat the pads with, or dip them in, some liquid such as creosote, pine tar, or petroleum products such as kerosene, cracking oil residues and asphalt cutbacks (asphalts diluted with a light distillate oil), for installation on the track. Even if the pads are not coated with talc or the like, it is advantageous to coat the pads before installation with one of these materials which promote adhesion.

Example I

In an example of the invention a glass fiber membrane, marketed under the name of Fiberglas by the Owens-Corning Fiberglas Company and composed of glass fiber and resin, random reinforced, weighing 2.5 pounds per hundred square feet, was coated with certain asphalt-rubber compositions. The asphalt used had the following tests:

Softening point, R. & B. _____ ° F__ 150
Ductility at 77° F. _____ 4
Penetration at 77° F. _____ 59
Penetration at 32° F. _____ 41
Penetration at 115° F. _____ 117

In run A the rubber component consisted of reclaimed tire tread ground to 20 mesh and in run B the rubber was composed of mechanical scrap rubber ground to 20 mesh. Finely ground oyster shell was included as filler. The composition of the coating material and the tests on the mixtures were as follows:

|  | A | B |
|---|---|---|
| Composition: | | |
| Asphalt_____wt. percent_ | 58.5 | 58.5 |
| Ground tire tread_____do____ | 25.0 | |
| Mechanical scrap_____do____ | | 25.0 |
| Oyster shell_____do____ | 10.0 | 10.0 |
| Pine tar_____do____ | 6.5 | 6.5 |
| Tests: | | |
| Softening point R. & B., ° F_____ | 292 | 262 |
| Penetration at— | | |
| 77° F_____ | 40 | 37 |
| 32° F_____ | 39 | 30 |
| 115° F_____ | 54 | 49 |

The glass fiber sheet was run through the coating tank at a temperature of 400° F. in run A; the mixture of run B was less viscous than that of run A and was coated at a temperature of 380° F. The coated products after being cut to tie pad sizes of 9" x 18" weighed 1.2–1.5 pounds each. The pads were coated with talc and upon being stacked in bundles exhibited a satisfactory stacking test with no sticking together and with no bleeding of the coating composition. Pads from these two runs were dipped in various material including asphalt cutback, cracked residuum and pine tar and were placed under the tie plates on railroad tracks.

*Example II*

In another group of runs in accordance with the invention a glass fiber mat resin bonded and random reinforced was coated with various asphalt-rubber compositions. Two different asphalts were used designated herein as asphalt A and asphalt B. Tests on these asphalts were as follows:

|  | Asphalt A | Asphalt B |
|---|---|---|
| Softening point R. & B., °F_____ | 218 | 153 |
| Penetration at: | | |
| 77° F_____ | 21 | 56 |
| 32° F_____ | 16 | 37 |
| 115° F_____ | 35 | 101 |

20 mesh reclaimed tire tread and mechanical scrap rubber were employed and in some of the runs finely ground oyster shell was used as filler in the coating composition. In certain of the runs a synthetic wax of resinous character known as Acrawax was added to the coating composition. The compositions of the several coating mixtures and the tests on the mixtures are given in the following table:

|  | C | D | E | F | G | H |
|---|---|---|---|---|---|---|
| Composition, wt. percent: | | | | | | |
| Asphalt A | 79.75 | | | | 75.00 | 69.50 |
| Asphalt B | | 74.75 | 70.00 | 65.00 | | |
| Ground tire tread | 20.00 | 25.00 | 22.00 | | 18.00 | |
| Mechanical scrap | | | | 25.00 | | 22.00 |
| Oyster shell | | | 8.00 | 10.00 | 7.00 | 8.50 |
| Synthetic wax | 00.25 | 00.25 | | | | |
| Tests: | | | | | | |
| Softening point R. & B., °F | 313 | 265 | 265 | 260 | 311 | 305 |
| Pen. at— | | | | | | |
| 77° F | 22 | 47 | 42 | 45 | 25 | 18 |
| 32° F | 18 | 58 | 42 | 37 | 25 | 12 |
| 115° F | 26 | 51 | 77 | 57 | 25 | 21 |

The glass fiber mat was coated with the several compositions at temperatures within a range of 350–450° F. Pads from the several runs were placed beneath the tie plates on railroad tracks, after the pads had, in most cases, been dipped in either creosote, cracked residuum or asphalt cutback. The pads dipped in the cracked residuum produced somewhat better seals to the tie and tie plate than those dipped in the asphalt cutback but on account of the higher viscosity of the cracked residuum the use of this material was somewhat more than time consuming than the use of the cutback.

*Example III*

In another group of runs in accordance with the invention of the coating composition was modified for the purpose of preparing a glass fiber impregnated mat of a highly tacky nature and particularly adapted for the squeezing of the coating material thru the unused tie plate spike holes. In these runs a 90 penetration air-blown vacuum residuum was used as the asphalt component of the coating composition. Coating compositions were prepared by mixing the asphalt with granulated rubber, in some cases with the addition of ground oyster shell filler, at a temperature of 400° F. Typical compositions and tests of the coating materials prepared are given in the table which follows:

|  | A | B | C |
|---|---|---|---|
| Composition, wt. percent: | | | |
| 90 Pen. Asphalt | 75 | 65 | 80 |
| Mechanical Scrap | 25 | 25 | |
| Oyster shell | | 10 | |
| Vulcanized crumb | | | 20 |
| Tests: | | | |
| Softening Point R. & B., °F | 232 | 244 | 236 |
| Penetration at— | | | |
| 77° F | 59 | 57 | 60 |
| 32° F | 39 | 48 | 47 |
| 115° F | 82 | 81 | 91 |

In run A the asphalt was blended with mechanical scrap rubber, in run B with mechanical scrap rubber and ground oyster shell and in run C the asphalt was mixed with 30 mesh vulcanized crum rubber.

In preparing the coating composition containing a filler such as oyster shell the ratio of rubber to filler was varied as high as about 4:1. In general, however, ratios approximately 2.5:1 appear to be best from the standpoint of uniformity of mixture, ease of handling the coating composition and test results. Three methods of preparing the coating composition with the filler were used. In one method the pulverized rubber was blended with the asphalt and then the filler was added. In the second method the filler was first mixed with the asphalt and then the rubber was added and in the third method the pulverized rubber and filler were mixed together and then blended with the asphalt. The third method gave the best results; for example, it was employed in the preparation of compositions E, F, G and H of Example II. The presence of the filler facilitates the blending of more pulverized rubber with the asphalt and promotes uniformity in the mixture.

The addition of pine tar to the coating composition appears to facilitate the incorporation of greater amounts of granulated rubber and filler in the coating composition. The presence of the pine tar has a tendency to produce a hardening effect on the finished blends. The pine tar may reduce the flash test of the finished blend but such reduction in flash need not ordinarily involve any serious hazard since the coating of the glass fiber membrane can usually be conducted at temperatures below the flash point of the mixture.

Although it is considered that the method of first preparing a coating solution containing the asphalt and rubber and the filler or adhesive agent when used and then passing the glass fiber sheet through the coating material is the preferred method of making the tie pads, another method that may be used is to first coat the glass fiber mat with asphalt then deposit granulated rubber on the coated surface and finally give the sheet a second coating of asphalt.

Obviously, many modifications and variations of the invention, as hereinbefore set forth, may be made without departing from the spirit and scope thereof, and therefore only such limitations should be imposed as are indicated in the appended claims.

We claim:

1. A flexible railroad tie pad consisting of a single glass fiber membrane encased within an asphaltic composition, said composition consisting essentially of between about 15–35 wt. percent rubber, 5–15 wt. percent pulverulent mineral aggregate and 50–80 wt. percent petroleum asphalt, said petroleum asphalt having a softening point between 100 and 250° F. ring and ball, said wt. percent based on the total weight of said composition.

2. A railroad tie pad in accordance with claim 1 wherein said aggregate is ground oyster shell.

3. A railroad tie pad in accordance with claim 1 wherein said composition also consists essentially of 5–10 wt. percent pine tar.

4. A railroad tie pad in accordance with claim 1 wherein said tie pad is coated with a powdered mineral material selected from the group consisting of mica and talc for rendering said pad non-adhesive for storage and transportation.

References Cited in the file of this patent

UNITED STATES PATENTS

| | | |
|---|---|---|
| 2,407,582 | Soday | Sept. 10, 1946 |
| 2,686,009 | Crowe | Aug. 10, 1954 |
| 2,688,005 | Clayton | Aug. 31, 1954 |
| 2,713,013 | Spokes | July 12, 1955 |
| 2,770,421 | Wilson | Nov. 13, 1956 |

OTHER REFERENCES

Modern Railroads, October, 1950, page 67, "Fabco Tie Pads."